Patented July 4, 1950

2,514,341

UNITED STATES PATENT OFFICE 2,514,341

HERBICIDE

Robert P. Russell, New York, N. Y., assignor to Standard Oil Development Company, a corporation of Delaware No Drawing. Application October 21, 1947, Serial No. 781,247

8 Claims. (Cl. 167—45)

This invention relates to improved compositions for the control and destruction of weeds and more particularly to improve methods for the destruction of weeds through the use of the beforementioned compositions.

Weeds are a menace to growing crops and may be undesirable even in the absence of other plants. Examples of the latter category are weeds on clearings, on fields before excavation, on athletic fields, etc. Control of both types of weeds is sometimes attempted through their destruction prior to the seed forming stage. This is quite difficult to achieve however. Hand picking and mechanical removal have been resorted to but these methods are obviously not commercially feasible on large tracts of land.

Selective and contact herbicides have been developed therefore for the removal of weeds.

Selective herbicides are weed killers which control certain species of plants without seriously injuring other species. They are utilized particularly to destroy undesirable weeds in turf or on land where various agricultural crops grow.

Contact herbicides are non-selectively toxic to plant foliage. They kill by a relatively quick-burning effect and are not translocated throughout the plants. The term "Chemical Mowing" has been applied to this action.

Various hydrocarbon oils and particularly petroleum fractions have been used for both of the above listed purposes.

The relatively more volatile petroleum fraction, having only a minor quantity of aromatics, have been used for selective spraying of carrots, parsnips, parsley and celery. Stove oil, and various naphtha-like products having fairly definite flash and final boiling points, aromatic contents between 10 and 15%, a relatively rapid evaporation rate and an acute rather than a chronic toxic effect have been used for this purpose.

The less volatile, more aromatic, i. e. up to 70% aromatics, petroleum distillates, such as highly cracked fractions, Diesel oils, and heating oils have been used as contact herbicides for irrigation, drain ditches, along highway banks, in industrial plant areas, in waste areas and in orchards.

The use of either type of the above-listed herbicides necessitates large quantities of the active materials, i. e., in some cases 100 to 200 gallons per acre for complete denudation.

In an effort to reduce the necessary quantities of the active ingredients these hydrocarbons have been emulsified in water with wetting agents and then sprayed on plants. The effectiveness of the hydrocarbon oils is greatly reduced when used in this form however. The reason is believed to lie in the poor wetting of plant surfaces in the presence of water. The latter substance preferentially wets the plant surfaces and the active oil ingredients drip off. Another difficulty in using these emulsified oil sprays especially arises from their poor penetration of root passages. Recovery from the roots is therefore to be expected and repeated applications are required for effective control of weed growth, particularly in humid areas. Excessive quantities of the hydrocarbon oils may thus be necessary.

One of the objects of this invention is to provide herbicidal compositions with improved root killing characterstics.

Another object is to provide improved herbicidal compositions which are more effective weed killers and require lesser amounts of active materials.

It has now been found that herbicidal compositions containing a liquid herbicidal hydrocarbon oil, a water-soluble emulsifying agent for intimately dispersing the oil in water, and an imidazoline of the general formula

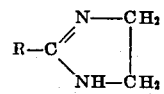

wherein R is either a saturated, unsaturated or substituted alkyl group ranging from 10 to 23 carbon atoms, are ideally adapted to obtain the beforementioned objects.

The compositions of this invention are first emulsified in water by mechanical agitation and then sprayed on the plants in the conventional manner.

The imidazolines apparently invert the action of the water emulsion spray compositions resulting in considerably greater deposits of the hydrocarbon oils on the surface of the weeds. This is very important as it effectuates a considerable saving in the requisite amount of the hydrocarbon oil. It is believed that the reason for the beforementioned results lies in the fact that imidazoline preferentially decreases the interfacial tension between the hydrocarbon oils and the weeds. In addition greater penetration of root passageways is attained and more permanent weed removal is thereby achieved.

Both the water-soluble emulsifying agent and the imidazolines are necessary. The imidazolines are only slightly soluble in water and most hydrocarbon oils. The solubility in the latter is higher than in the former but does not exceed 4% in any case. They are therefore extremely poor emulsifying agents for oil and water mixtures where the water content exceeds 25%. Consequently the emulsifying agent is necessary to obtain the uniform emulsions of the oil in water. When spray mixtures of only oil, water and imidazoline were prepared the emulsions always broke during the half-minute required to spray the plants.

As previously stated, the imidazolines used in this invention are of the general formula:

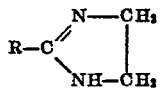

wherein R is either a saturated, unsaturated or substituted alkyl group ranging from 10 to 23 carbon atoms.

The saturated alkyl group may be selected from the following acids:

Lauric
Myristic
Palmitic
Stearic
Archidic
Carnaubic and the unsaturated alkyl group may be selected from the following acids:

Hypogeic
Oleic
Linolinic
Erucic
Linoleic

Products of the following general formula may also be used:

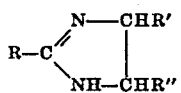

wherein R is the same as listed in the preceding general formula and R' and R'' are either alkyl or substituted alkyl groups.

The preparation of the imidazoline used in this invention is described in U. S. Patent No. 2,361,488 and need not be herein described.

The water-soluble emulsifying agents that may be used comprise long chain alcohols such as dodecanol and octadecanol, alcohol and acid sulfates and their derivatives such as amides and esters, acid alkyl sulfates of $C_{10}$ to $C_{18}$ length, sulfonated aromatic and mixed alkyl-aryl derivatives, esters of fatty acids such as the ricinoleic acid ester of sorbitol, and petroleum sulfonates of $C_{10}$ to $C_{18}$ length. It is to be understood that these and similar compounds are intended when the term "emulsifying agent" is used hereafter.

Hydrocarbon herbicidal oils useful as ingredients of the compositions of this invention comprise the conventional selective herbicidal oils, e. g. Stoddard solvent, an aliphatic naphtha product boiling between 340–425° F. which is described in a co-pending application for patent, No. 765,816, filed on August 2, 1947, and the conventional contact herbicidal oils, including the petroleum fractions used for both purposes.

The invention will be better understood by reference to the following examples of the use of the compositions of this invention for the stated purposes.

Spray solutions were prepared by adding two volume per cent of commercial emulsifying agents, e. g. petroleum sulfonates, to various hydrocarbon oils. This was sufficient to form a stable (for more than 15 minutes) emulsion when subsequently diluted with water. In each case the solutions were divided into two portions, and 1.0% of heptadecylimidazoline was added to one of the portions. Fractions of each portion were then diluted to various concentrations with water and sprayed on coleus plants.

The results are tabulated below:

EXAMPLE I

Aromatic extract of kerosene B. P. (400–600° F.)

| Volume per cent of water in emulsion | Contact herbicidal petroleum oil fraction—Condition of plant three days after treatment | |
|---|---|---|
| | Imidazoline present | No imidazoline present |
| 98 | Slight Injury | No injury. |
| 90 | Dead | Moderate burning. |
| 75 | do | Dead. |
| 50 | do | Do. |

EXAMPLE II

Steam cracked naphtha B. P. 400–650° F.

| Volume percent of water in emulsion | Contact herbicidal petroleum oil fraction—Condition of plant three days after treatment | |
|---|---|---|
| | Imidazoline present | No imidazoline present |
| 98 | Slight burning | Slight burning. |
| 90 | Complete defoliation | Partial defoliation. |
| 75 | Dead | ½ dead. |
| 50 | do | Dead. |

EXAMPLE III

Untreated naphtha B. P. 300–400° F.

| Volume percent of water in emulsion | Selective herbicidal petroleum oil fraction—Condition of plant three days after treatment | |
|---|---|---|
| | Imidazoline present | No imidazoline present |
| 98 | No injury | No injury. |
| 90 | Strong injury | Slight injury. |
| 75 | Dead | Dead. |
| 50 | do | Do. |

EXAMPLE IV

Synthetic aliphatic hydrocarbon fraction B. P. 340–425° F.

| Volume percent of water in emulsion | Selective herbicidal oil—Condition of plant three days after treatment | |
|---|---|---|
| | Imidazoline present | No imidazoline present |
| 98 | ¼ dead | Slight injury. |
| 90 | ½ dead | Do. |
| 75 | dead | dead. |
| 50 | do | Do. |

It is evident from the above-listed examples that savings of as much as 25% in the amount of oil can be realized, and a more efficient killing action obtained.

Emulsion stocks of the following formula are typical of the type that can be used in the preparation of water emulsions.

EXAMPLE V

| | Parts |
|---|---|
| Herbicidal oils | 95 |
| Imidazolines | 2 |
| Emulsifying agent | 3 |

The emulsion stock of Example V can then be diluted to above 80 volume per cent water and still retain herbicidal potency. The concentrations of the oil depend on the plants being treated.

The herbicidal oil compositions described in this invention have also been used effectively to control weeds in economic crops by the pre-emergence weed control method as indicated in Examples VI and VII.

The pre-emergence chemical treatment of crop land depends on the spraying of the weeds before the main plants emerge above the ground. Extreme care is essential however where dicotyledonous plants such as beans are grown. With these plants the hypocotyl emerges first and is very sensitive to conventional contact sprays. It should be noted therefore that good results have been obtained on these vegetables with the compositions of this invention using the pre-emergence spraying treatment.

EXAMPLE VI

A plot of ground was prepared in the conventional manner for planting and approximately 3 days later, several beds of radishes, beans and corn were planted. Three days after planting the newly seeded plots were sprayed with an aqueous herbicidal emulsion prepared by mixing in equal volume proportions, water and a herbicidal composition comprising 96 parts steam cracked naphtha B. P. 400–650° F., heptadecyl imidazoline 2 parts, and a petroleum sulfonate 2 parts. The spray mixture killed the weeds that had sprouted after the soil was prepared and those that sprouted a day or two after the spraying. The naphtha had evaporated by the time the economic crop had emerged and caused no plant injury to the economic crop.

EXAMPLE VII

A test was conducted in the same manner as in Example VI except that an aromatic extract of kerosene boiling between 400–600° F. was used instead of the steam cracked naphtha. Similar results were obtained as in Example VI.

Diverse weeds such as the following are effectively treated by the compositions of this invention:

Knotweed (*Polygonum aviculare*)
Bluegrass, annual (*Poa annua*)
Crab grass (*Digitaria sp.*)
Yarrow (*Achillea millefolium*)
Onion, wild (*Allium sp.*)
Plantain, broad-leaf (*Plantage major*)
Speedwell or veronica (*Veronica sp.*)
Strawberry, false (*Duchesnea indica*)
Plantain, buckhorn or narrow-leaf (*Plantage lanceolata*)
Nimblewill, or bush muhly (*Muhlenbergia schreberi*)
Chickweed, mouse-ear (*Cerastium sp.*)
Bugleweed (*Ajuga reptans*)
Heal-all (*Prunella vulgaris*)
Gill-over-the-ground or ground ivy (*Nepeta hederacea*)
Pennywort (*Hydrocotyle rotundifolia*)
Chickweed, common (*Stellaria media*)
Plantain, Rugel's (*Plantago Rugelii*)
Sorrel, wood (*Oxalis sp.*)
Moneywort (*Lysimachia Nummularia*)
Vervain, prostrate (*Verbena bracteosa*)
Purslane, milk or spotted spurge (*Euphorbia maculata*)
Sorrel, red or sheep (*Rumex acetosella*)
Paspalum (*Paspalum sp.*)
Henbit (*Lamium amplexicaule*)
Goosegrass (*Eleusine indica*)
Dandelion (*Taraxacum officinale*)
Buttercup (*Ranunculus sp.*)
Clover, white (*Trifolium repens*)
Medic, black or yellow trefoil (*Medicago lupulina*)

This invention has been described with respect to specific embodiments but is not to be limited thereby except as indicated in the appended claims.

What is claimed:

1. A herbicidal oil composition comprising in combination a herbicidal hydrocarbon oil, said oil boiling in the range of 300° to 650° F., and being substantially free of higher boiling asphaltic material, a water soluble emulsifying agent, and an imidazoline of the general formula—

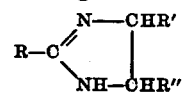

wherein R is selected from the group consisting of saturated, unsaturated and substituted alkyl groups having from 10 to 23 carbon atoms inclusive and R' and R" are selected from the group consisting of hydrogen, alkyl and substituted alkyl radicals.

2. A herbicidal composition as in claim 1 wherein the imidazoline is heptadecylimidazoline.

3. A herbicidal composition as in claim 1 wherein the imidazoline comprises from a trace to 3% of said composition.

4. A petroleum oil herbicidal composition comprising in combination a major proportion of said petroleum oil, said oil boiling in the range of 300° to 650° F., and being substantially free of higher boiling asphaltic material, a minor proportion of a water soluble emulsifying agent, and a minor proportion of an imidazoline of the general formula—

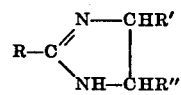

as an inverting agent, wherein R is selected from the group consisting of saturated, unsaturated and substituted alkyl groups having from 10 to 23 carbon atoms inclusive, and R' and R" are selected from the group consisting of hydrogen, alkyl, and substituted alkyl radicals.

5. A herbicidal composition as in claim 4 wherein the emulsifying agent is a petroleum sulfonate having from 10 to 18 carbon atoms.

6. A herbicidal emulsion concentrate composition comprising a herbicidal hydrocarbon oil, said oil boiling in the range of 300° to 650° F., and being substantially free of higher boiling asphaltic material, a water soluble emulsifying agent and an imidazoline of the general formula—

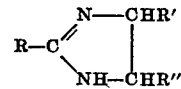

wherein R is selected from the group consisting of saturated, unsaturated and substituted alkyl groups having from 10 to 23 carbon atoms inclusive and R' and R" are selected from the group consisting of hydrogen, alkyl and substituted alkyl radicals.

7. A herbicidal oil comprising principally a steam cracked naphtha boiling between 400°–650° F., and containing in solution in said naphtha a minor proportion of a petroleum sulfonate having from 10 to 18 carbon atoms and a minor proportion of heptadecyl imidazoline.

8. A pre-emergent spray oil composition comprising an aromatic extract of kerosene, a minor proportion of a petroleum sulfonate and a minor proportion of heptadecyl imidazoline.

ROBERT P. RUSSELL.

REFERENCES CITED

The following references are of record in the file of this patent:

UNITED STATES PATENTS

| Number | Name | Date |
|---|---|---|
| 2,361,488 | Mikeska | Oct. 31, 1944 |
| 2,375,653 | Holmes | May 8, 1945 |
| 2,387,336 | Littler | Oct. 23, 1945 |
| 2,389,680 | Mikeska | Nov. 27, 1945 |
| 2,389,681 | Mikeska | Nov. 27, 1945 |
| 2,414,640 | Fischer | Jan. 21, 1947 |
| 2,430,576 | Littler | Nov. 11, 1947 |

FOREIGN PATENTS

| Number | Country | Date |
|---|---|---|
| 847,829 | France | Oct. 17, 1939 |